July 9, 1935.  R. G. FEAR  2,007,468
FILM MAGAZINE AND THE LIKE
Filed June 4, 1931
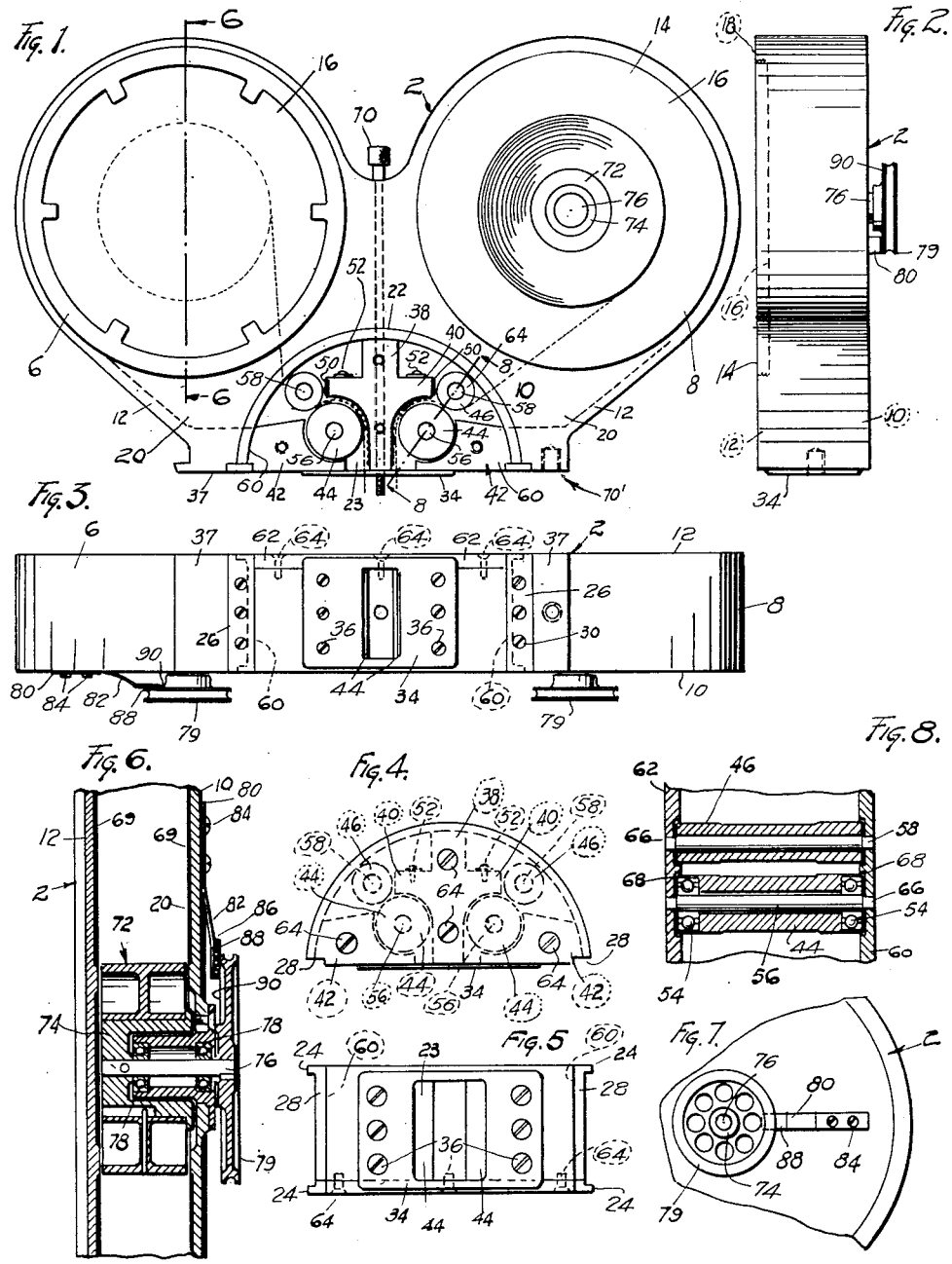
INVENTOR.
RALPH GORDON FEAR
BY
ATTORNEY.

Patented July 9, 1935

2,007,468

UNITED STATES PATENT OFFICE 2,007,468

FILM MAGAZINE AND THE LIKE

Ralph Gordon Fear, Los Angeles, Calif.

Application June 4, 1931, Serial No. 542,023

3 Claims. (Cl. 88—17)

My invention relates to film magazines for motion picture apparatus and more particularly to the film magazines of such types and construction which are adaptable to hold and supply a sensitized film to and receive it from said apparatus, as for an instance a camera, also, which may be used for storing of said film within said magazine when not in immediate use and protect said film within said magazine from exposure to light.

In the film magazines of known construction, it is found that the sensitized film therein stored or used therefrom is easily exposed to light, because of the manner employed, such as rollers, shutters or other mechanical means, which are believed to be sufficient in preventing said light from entering said film magazines; further, a roll of said film enclosed within said magazines is never under constant control while in use or otherwise, and lastly the accumulation of dust around and within the film passage ways, is the prime cause of objectionable scratches or spots, which may be left upon negatives wherefrom the positive films are printed.

It accordingly is an object of my invention to provide a novel form of film magazine structure, having a detachable light trap structure with multiplicity of curved film passages positioned therein, thus preventing said light from entering the interior of said magazine structure, causing film exposure.

Another object of my invention is to provide said film magazine with a film spool friction means, preferably in the form of a brake, whereby said spool may be held constantly under control, thus preventing possible slackening and looping of said film, when the motion picture apparatus operating mechanism ceases to function, and also, to prevent said roll of film from unwinding from the storage chamber, when said magazine is not attached to said motion picture apparatus.

A further object of my invention is to construct said film magazine in such manner, whereby it may be easily cleaned by removing said light trap structure and the side magazine covers, thus preventing an excessive dust and grit accumulation, also, which may be easily and quickly attached to said motion picture apparatus.

The above and further objects and advantages as will hereinafter more fully appear, I attain by the construction shown and described in the specification and illustrated on the drawing, forming a part of my application.

Reference is had to the accompanying drawing in which similar reference characters denote similar parts.

Fig. 1 is a front elevational view of my novel form of film magazine structure, mounted upon a motion picture apparatus (shown in dotted lines).

Fig. 2 is a side elevational view thereof, taken in the direction of the arrow 2.

Fig. 3 is a bottom view of said film magazine structure.

Fig. 4 is a front elevational view of the light trap structure, detached from said magazine.

Fig. 5 is a bottom view of said light trap structure.

Fig. 6 is a fragmentary cross sectional view of the magazine structure, taken on the line 6—6 of Fig. 1.

Fig. 7 is a fragmentary side elevational view of the brake structure.

Fig. 8 is a cross sectional view of the light trap rollers taken on the line 8—8 of Fig. 1.

Describing my invention more in detail, said invention comprises a plurality of film magazine structures in coplanar relation, generally designated by numeral 2, having a centrally positioned light trap structure as at 4.

The film magazine structure 2 comprises the film compartments 6 and 8, having a wall 10, covering the entire rear side, also having front wall 12, which is provided with a pair of openings 14, to receive circular cover plates 16, in any manner adaptable in practice, preferably screw threaded as at 18, and the opening 20, of said magazine structure 2, is also provided with a cut-away section 22, which may be of any configuration, preferably of concave structure as shown, which is adapted to receive said light trap structure 4.

To hold said structure 4 in central location, I have provided therein a pair of side flanges 24, which are also for the purpose of preventing the light from entering the interior of said magazine structure; said light trap structure 4 is held in place by means of plates 26, adapted to fit in the grooves 28, and which are held in position by means of screws, as at 30.

The structure 4 may be removed entirely out of said magazine structure 2, thus allowing said magazine to be at all times clean and free from dirt, which may be accumulated during the course of time, and therefore preventing possible scratching of the surfaces of the passing film.

The center opening 23, of the structure 4, is also provided with a plate 34, held in place by means of screws 36, and which is adapted to shut-off the light along the surface 37, when said magazine 2 is coupled with the motion picture apparatus, preventing possible exposure of the film, while passing from said film magazine to the motion picture apparatus and return.

The structure 4 comprises of a centrally positioned division wall 38, which has a pair of concave projections, as at 40, also a pair of concave end blocks 42, adapted to house a pair of trap rollers 44 and a plurality of guide rollers 46.

It will be obvious to note that the light entering said light trap structure 4, through the opening or film passage 23, can not enter any further than the distance allowed by said opening and to prevent possible surface reflection of said light, I have provided said concave projections 40, with a fibrous covering 50, such as felt, velvet or the like, preferably of dark shade, which may be held in place in any most adaptable in practice, such as by means of screws as at 52.

The trap rollers 44 are provided with a pair of frictionless means, such as ball bearings 54, which are substantially mounted upon the shaft 56, also the guide rollers 46, are rotatably positioned upon the shaft 58. Said shafts 56 and 58 respectively, are substantially positioned in-between the side wall 60, and the side cover 62, which is being held in place by means of screws 64; also to prevent possible entry of light, by way of the mounting of said shaft, as at 66, I have provided a roller recess 68, for that purpose.

The interior of said magazine structure 2, and the internal side of the cover plates 6 and 8 respectively are lined with fibrous material 69, such as felt, velvet or other heavy cloth, of any suitable color, which serves as an additional preventive of light reflection within said magazine structure.

Provision is being made to attach said structure 2 upon said motion picture apparatus, by means of a centrally positioned thumb screw 70, which may be used in addition or as a substitute to the usual conventional type of locking screw generally used. Provision is made for such a conventional locking screw by the machining of a tapped hole in the base of the magazine as indicated by the numeral 70'. (Shown in dotted lines, Fig. *.)

The film compartments 6 and 8 respectively, are also provided with internally positioned film spools 72, which are rotatably mounted upon a hub 74, (shown in Fig. 6). Said hub 74 is substantially associated with a shaft 76, mounted in a pair of frictionless bearings 78, and the outwardly extended end of said shaft 76 is provided with a take-up pulley 79, which is used for rotating said film spool 72.

To prevent possible looping or slacking of the film within said film magazine 2, when the operating mechanism of the motion picture apparatus ceases to function, also to prevent possible unwinding of said film, out of said film magazine when not in operation, I have provided a braking means 80, in a form of a brake, (Figs. 3, 6 and 7) comprising a yielding means 82, such as a flat spring or the like, which may be attached to the wall 10, in any manner most adaptable in practice, preferably by screws, as at 84.

The movable end 86 of said spring 82 is provided with a fibrous material 88, preferably a strip of leather or the like, which is adapted to bear constantly against the surface 90 of said pulley 79, thus providing an inexpensive and very efficient brake means for said film spool 72.

While I have thus described my invention with great particularity, it will be clear that the same may be modified throughout a wide range. I accordingly do not propose to be limited to the exact details of construction as shown and described in this specification and reserve the right in practice to make any and all modifications, which may fall within the scope of the appended claims.

I claim as my invention:

1. In a film magazine structure of the character described, a light trap means adapted to be associated with said magazine structure having a semi-circular wall, divisional means integral with said semi-circular wall having a plurality of concave means positioned thereon, a plurality of concave blocks positioned one at each end of said light trap means, a plurality of film guiding means rotatably positioned within said light trap means and a pair of light trap rollers rotatably positioned within the concave structure of said concave means of said divisional means and said end blocks, thus forming an irregular course for the film to follow out of said film chambers through said light trap means.

2. In a light trap means of the character described, comprising a pair of side wall structures, having a divisional wall centrally positioned, a pair of concave means extending from the said divisional wall, a plurality of concave blocks positioned one at each end between the said side walls of said light trap means, recessed means internally positioned to said side walls to house light trap rollers within said concave depressions, recessed means internally positioned of said side walls for housing a plurality of film guiding rollers in juxtaposition to said light trap rollers, thus creating an irregular passage for the film to follow, and a locating plate associated with said concave blocks so that the said light trap means may be located upon an apparatus, where it is to be used.

3. In a film magazine structure of the character described, a light trap means adapted to be associated with said magazine structure, having semi-circular walls on each side, a divisional means centrally positioned and integral with said semi-circular wall, a concave means integral with said divisional means and positioned between said semi-circular walls, covering means adapted to be associated with the concave means and the said divisional means, a pair of blocks located between the said semi-circular walls and positioned one at each end of said light trap means, a concave depression associated with said blocks located in juxtaposition with said concave means of said divisional means, a plurality of recessed depressions positioned internally of said semi-circular walls, a plurality of film guiding means rotatably positioned within said recessed depressions and between the said semi-circular walls, a pair of light trap rollers rotatably positioned within said recessed depressions and within the concave means of said divisional means and said blocks, thus forming an irregular path for the film to follow and which is only in contact with rolling surfaces of the apparatus, substantially as described.

RALPH GORDON FEAR.